(12) United States Patent
Nath

(10) Patent No.: US 6,507,688 B1
(45) Date of Patent: Jan. 14, 2003

(54) LIGHT GUIDE WITH A LIQUID CORE

(76) Inventor: Gunther Nath, Otto Heilmann Str. 3, Munchen (DE), 82031

( * ) Notice: Subject to any disclaimer, the term of this patent is extended or adjusted under 35 U.S.C. 154(b) by 0 days.

(21) Appl. No.: 09/581,601

(22) PCT Filed: Dec. 14, 1998

(86) PCT No.: PCT/DE98/03707

§ 371 (c)(1),
(2), (4) Date: Jun. 15, 2000

(87) PCT Pub. No.: WO99/31536

PCT Pub. Date: Jun. 24, 1999

(30) Foreign Application Priority Data

| Dec. 15, 1997 | (DE) | ............................................ 297 22 130 |
| Dec. 17, 1997 | (DE) | ............................................ 197 56 197 |
| Dec. 23, 1997 | (DE) | ............................................ 197 57 683 |
| Jul. 13, 1998 | (DE) | ............................................ 198 31 365 |
| Sep. 25, 1998 | (DE) | ............................................ 198 44 153 |

(51) Int. Cl.$^7$ ................................................. G02B 6/20
(52) U.S. Cl. ........................ 385/125; 385/142; 385/144
(58) Field of Search ........................... 385/125, 142–145

(56) References Cited

U.S. PATENT DOCUMENTS 5,412,750 A    5/1995   Nath ........................ 385/125

FOREIGN PATENT DOCUMENTS

| EP | 0349126 | 1/1990 | ............ G02B/6/00 |
| EP | 0357354 | 3/1990 | ............ C08L/45/00 |
| EP | 0421387 | 4/1991 | ............ G02B/1/04 |
| EP | 0438170 | 7/1991 | ............ G02B/1/04 |
| EP | 0459132 | 12/1991 | ............ G02B/1/04 |
| EP | 0633257 A1 * | 6/1994 | ......... C07D/317/42 |
| EP | 0645406 | 3/1995 | ......... C08F/234/02 |

* cited by examiner

*Primary Examiner*—Akm E. Ullah
*Assistant Examiner*—Jerry T Rahll

(57) ABSTRACT

The invention relates to liquid light guides, consisting of a tubular sheath, an inner coating of the sheath and a light-conducting liquid inside the sheath. Novel perfluorinated homo- or copolymers are used for the inner coating. The perfluorinated homo- or copolymers contain a perfluorinated fluorodioxole cyclic monomer.

31 Claims, No Drawings

LIGHT GUIDE WITH A LIQUID CORE

The invention concerns a liquid light guide as set forth in the classifying portion of claim 1.

Light guides or optical waveguides with a liquid core are generally known. They generally comprise a flexible sheath tube with an inner coating comprising an amorphous polymer and a light-conducting aqueous solution in the interior of the tube.

German patent application DE-OS No 42 33 087 discloses a liquid light guide which includes a cylindrical tubular sheath comprising a fluorocarbon polymer, and a core surrounded by the sheath and comprising a light-conducting aqueous solution. On its inside the sheath is covered with a thin layer comprising a completely amorphous copolymer which is based on a combination of tetrafluoroethylene and a perfluorinated cyclic ether. The copolymer which constitutes the inner layer can be obtained from DuPont under the trade name Teflon® AF.

Teflon® AF can be dissolved in given perfluorinated liquids only in the range of a few percent, in which respect suitable solvents are the fluorinated liquids FC 72, FC 75 (perfluoro-n-butyl tetrahydrofuran), FC 77 or FC 40 from 3 M. The procedure for applying the AF-layer to the inner surface of a fluorocarbon tube such as for example Teflon® FEP is implemented in a simple manner by once wetting the inside surface of the tube with the Teflon® AF-bearing solution and then evaporating the solvent by means of a flow of air or reduced pressure. The thickness of the layer obtained in that way is only a few $\mu$ which in the case of a Teflon® FEP substrate tube or a Hyflon® MFA tube, is sufficient for smoothing tube unevenness and for improving the total reflection of visible and ultraviolet rays as FEP and MFA tubes can be extruded with a very smooth inside surface (degree of roughness: $10^{-2}$–$10^{-1}\mu$). The advantages of the total-reflection Teflon®-AF layer lie in the extremely low refractive index of the material in the range of between 1.29 and 1.32, absolute transparency which is comparable to quartz glass, and chemical inertness. The aqueous salt-bearing solutions such as chlorides or phosphates which are described in DE 24 06 424 C2 and DE-OS No 40 14 363.5 and which have already proved their worth in a market situation for over twenty years are preferred as liquids for light guides, because of their photochemical stability in the ultraviolet spectral range. Those liquids such as for example $CaCl_2$ in $H_2O$, $NaH_2PO_4$ in $H_2O$ should have a refractive index which is higher than that of the total-reflection Teflon® AF layer, in which respect, because of the extremely low refractive index of the Teflon® AF layer, it is already possible to use refractive coefficients as from n=1.36 for the liquid. A value of at least 50° for the optical aperture angle $2\alpha$ should be achieved, in which respect $\alpha$ can be calculated by means of the simple formula:

$$\sin \alpha = \sqrt{n_{core}^2 - n_{sheath}^2}$$

Liquid light guides having a core comprising an aqueous phosphate solution such as for example a solution of $NaH_2PO_4$ in water, which has a particularly high level of photochemical stability in the short-wave ultraviolet UVB and UVC spectral range (see P 40 14 363.5) can actually only be implemented by using a total-reflection layer with a refractive index of about 1.31 such as for example with Teflon® AF 1600, as solutions of that kind do not permit a substantially higher refractive index than n=1.38 because of salt precipitation in the cold.

The use of Teflon® AF for the inner coating of light guide tubes is however not entirely without its problems.

Layers comprising Teflon® AF only have good adhesion to substrates which like AF also comprise fluorocarbon polymers, in particular after the implementation of a heat-treatment process in which the layer and the substrate tube have to be heated to temperatures to above the glass transition temperature (Tg) of the AF-modification used.

In the heat treatment process which improves adhesion and which has been previously described by DuPont, the layer-substrate system has to be heated to temperatures above 160° C. and, depending on the respective modification of the AF material, even above 240° C., which really is only tolerated by substrate materials comprising fluorocarbon polymers.

In addition, mention is to be made of the low degree of solubility of the Teflon® AF-modifications in the perfluorinated solvents FC75/FC77 (3M), which does not always make it possible, in particular when dealing with substrate tubes of Teflon® PFA, to produce the required minimum layer thickness of up to $5\mu$ by a single wetting procedure for the inside surface of the tube with the Teflon AF-solution, in particular when using the AF-modifications with Tg>160° C.

In comparison with extruded tubes comprising Teflon® FEP, extruded tubes of Teflon® PFA have a greater degree of roughness in respect of the inside surface ($>10^{-1}\mu$) and therefore, for optimum optical total reflection require a greater thickness in respect of the inner layer than coated FEP tubes.

A serious disadvantage of Teflon® AF lies in its extremely high cost of US$ 10.00 per gram, which makes a markedly significant difference in terms of manufacture of the liquid light guides.

It would also be desirable also to have available an optical coating material for total reflection, for other substrate materials than Teflon® FEP, in order to be able to manufacture liquid light guides with different mechanical properties such as for example enhanced flexibility. A coating material of that kind should have a substantially increased degree of solubility, in comparison with Teflon AF, in fluorinated liquids, so that by a single wetting process it is possible to produce layer thicknesses of up to $5\mu$, as are required for example for coating Teflon® PFA or THV (3M) tubes.

That coating material would preferably be a perfluorinated amorphous polymer which has a glass transition temperature markedly below 160° C. so that it is also possible to use substrate materials consisting of THV (3M), polyurethane, polyolefin, polyethylene, silicone and others, which can be thermally loaded to a lesser degree. Such substrate materials require drastically greater layer thicknesses just because of their substantially higher refractive index as, in contrast to perfluorinated substrate tubes such as Teflon® FEP, they do not perform any supporting function in terms of total reflection, in particular when their refractive index is higher than that of the filling liquid.

Furthermore such a perfluorinated coating material which is an alternative to Teflon® AF should be very substantially transparent or amorphous, it should have a refractive index which is as far as possible below that of $H_2O$ and which like Teflon® AF is also soluble in certain perfluorinated liquids such as FC 75 or FC 77 from 3M, but preferably to an enhanced degree, so that a simple coating process for the inside surface of plastic tubes is possible by once wetting same with the solution of the amorphous fluoropolymer.

Finally it would be desirable if the perfluorinated amorphous copolymer, as an alternative to AF, were simpler to manufacture and could thus be offered on the market at a price markedly below US$ 10.00 per gram.

It will be appreciated that it is also important that the alternative coating material has good adhesion to Teflon® FEP or Hyflon® MFA or THV (3M), the most important tube materials for liquid light guides, or at any event after implementation of a heat treatment process above the glass transition temperature of the coating material.

Ausimont S.p.A. in EP 0 633 257 B1 and EP 0 803 557 A1 describes a perfluorinated copolymer of tetrafluoroethylene (TFE) which, besides TFE also contains a further perfluorinated monomer in the form of a cyclic perfluorinated fluorodioxole involving the following structure:

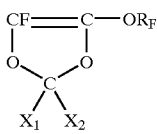

wherein $R_F$ can be a perfluoroalkyl having between 1 and 5 C-atoms and $X_1$ and $X_2$, independently of each other, can be —F or —$CF_3$.

Besides this novel cyclic perfluorinated fluorodioxole, instead of or in addition to TFE, further units of perfluorinated monomers such as hexafluoropropylene (HFP) or perfluoroalkylvinylether or perfluoro-2,2-dimethyl-1,3-dioxole (PDD) can be contained in the copolymer.

The quantitative composition of that perfluorinated copolymer from the specified monomer components can be varied in such a way as to afford a very substantially amorphous material which is soluble in the liquid FC 75 (3M) in the percentage range, more specifically up 20%!, it has an optical refractive index (measured at λ=400 nm) of between 1.318 and 1.328, it enjoys excellent transparency in the ultraviolet and visible spectral range and in addition it exhibits a glass transition temperature of between 60° C. and 170° C., depending on the respective quantitative molecular composition.

Preferred fluorodioxoles are those in which $X_1$ and $X_2$ comprise F and $R_F$ comprises $CF_3$ or $C_2F_5$. Also preferred are copolymers comprising units of TFE and the fluorodioxole, in which the molar proportion of the fluorodioxole is between 40% and 100%, which have an extremely low degree of residual crystallinity and which can be well dissolved to a proportion of more than 10 percent by weight in perfluorinated liquids such as for example FC 75 (3m) or in low-boiling perfluoropolyethers such as for example Galden® D80, and thus have a substantially higher level of solubility than Teflon® AF, more specifically with comparable values in respect of viscosity of the solutions. The trade name for the copolymers consisting of the monomer components TFE and the novel fluorodioxole is Hyflon® AD.

In addition EP 0 633 257 B1 and EP 0 803 557 A1 describe a homopolymer comprising 2,2,4-trifluoro-5-trifluoromethoxy-1,3-dioxole (abbreviated to TTD), which involves the following structure:

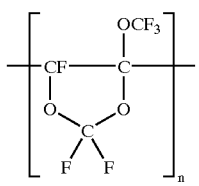

For n>10 that homopolymer is an amorphous solid fluoropolymer which is transparent, which dissolves in certain perfluorinated liquids such as for example FC 75 (3M) in a high percentage range, which has a very low refractive index (n~1.32) and which therefore, like the previously described copolymers TFE/TTD, is suitable for optical coatings by simply wetting a substrate with the dissolved polymer.

As these Ausimont materials do not, like Teflon® AF, contain the monomer component PDD (perfluoro-2,2-dimethyl-1,3-dioxole) which is technically difficult to manage, they are also easier to produce and they could at least in principle also be offered at lower cost.

The adhesion of the amorphous copolymer Hyflon® AD from Ausimont, comprising units of tetrafluoroethylene and the fluorodioxole TTD or a homopolymer of TTD-units, to the inside surfaces of the tube materials, which are preferred for liquid light guides, consisting of fluorocarbon polymers such as for example Teflon® FEP, Hyflon® MFA and THV (3M) is excellent, in particular after heat treatment above the glass transition temperature of the modification used.

In addition, the "12th European Symposium on Fluorine Chemistry", Berlin, Germany, Aug. 29–Sep. 2, 1998, PI-32 (Abstracts), saw the presentation by Ausimont of a new fluorodioxole: perfluoro-4-methyl-1,3-dioxole which involves the following structure (for the sake of simplicity referred hereinafter as PMD):

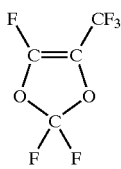

This novel fluorodioxole can be copolymerised with tetrafluoroethylene, in which case novel amorphous perfluorinated copolymers with particularly high glass transition temperatures Tg and a particularly low optical refractive index can be produced, comparable to the low coefficients of refraction of Teflon® AF. The solubility of these new copolymers:

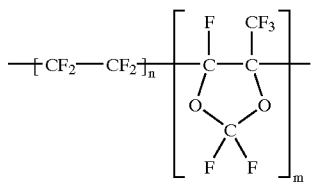

in the perfluorinated liquids FC 75 and FC 77 from 3M is admittedly not as high as that of Hyflon® AD, but it is still sufficiently high for the internal coating of perfluorinated sheath tubes of Teflon® FEP or Hyflon® MFA, the most important substrate materials for liquid light guides.

It is therefore also possible with these novel amorphous copolymers, by virtue of a single wetting operation, to achieve layer thicknesses in the range of a few μ, with adhesion of the layer to the perfluorinated substrate materials Teflon® FEP and Hyflon® MFA being excellent in particular after heat treatment above the glass transition temperature Tg of the material of the layer.

Besides the cyclic perfluorinated fluorodioxole PMD, instead of or in addition to TFE, further units of perfluorinated monomers such as hexafluoropropylene (FEP) or perfluoroalkylvinylether or perfluoro-2,2-dimethyl-1,3-dioxole (PDD) may also be contained in the copolymer.

In general terms the fluorodioxoles which differ from the fluorodioxole PDD contained in Teflon® AF and which can also be copolymerised with TFE to afford novel amorphous perfluorinated materials which are also soluble in certain perfluorinated liquids such as for example FC 75 from 3M and which are therefore suitable for coatings out of the liquid phase, can be represented generally in the following manner:

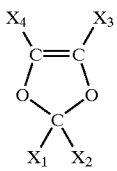

wherein
$X_1$, $X_2$, $X_3$ and $X_4$ bear the following meanings:
$X_1$ and $X_2$, independently of each other, stand for F or $C_nF_{2n+1}$, and
$X_1$ or $X_2$ also stand for $O-C_nF_{2n+1}$, and
$X_3$ and $X_4$, independently of each other, stand for F, $C_nF_{2n+1}$ or $O-C_nF_{2n+1}$,
wherein n denotes an integer of between 1 and 5,
excluding fluorodioxoles in which
$X_1$ and $X_2$ stand for $CF_3$, and
$X_3$ and $X_4$ stand for F (=Teflon® AF).

The improvement in the transmission of known liquid light guides comprising Teflon® FEP or Hyflon® MFA tubes filled with aqueous salt-bearing solutions, and the increase in the numerical aperture of the light guides by internal coating of the tubes with the novel Ausimont copolymers TFE/TTD or TFE/perfluoro-4-methyl-1,3-dioxole is of similar quality to the internal coating with Teflon® AF as described in P 42 33 087. It is particularly advantageous however that now, for example with the dissolved copolymer TFE/TTD, by virtue of its degree of solubility which is substantially higher in comparison with Teflon® AF, not just tubes of Teflon® FEP but also those of Teflon® PFA and THV (3M) can be easily provided by a one-off wetting operation with an internal layer of up to $5\mu$ thickness and even greater, which also makes it possible to use coated tubes of that kind as sheath tubes for liquid light guides affording optimum transmission. It is also possible to coat thinner capillary tubs ($\varnothing i<3$ mm) of fluorocarbon polymers with the Ausimont copolymer TFE/TTD more easily than with Teflon® AF, because in that respect the lower viscosity of the Ausimont polymer solution, with at the same time a higher level of solid content, has a highly advantageous effect, and it is thus possible to achieve an adequate layer thickness of some $\mu$. Surprisingly, it is possible to add to the copolymer TFE/TTD or the homopolymer of TTD or the copolymer TFE/perfluoro-4-methyl-1,3-dioxole (TFE/PMD) a perfluoropolyether (PFPE) such as for example Galden® (Ausimont) or Fomblin® (Ausimont) or Krytox® (DuPont) or Demnum® (Daikin), in which case it is possible to add up to 200 percent by weight of the PFPE in order in that way to further reduce the costs for a layer of defined layer thickness.

The mixed layer can be produced in a simple fashion by adding a suitable amount of the PFPE to the TFE/TTD or TFE/PDM-FC75 solution. Preferably the added PFPE has a boiling point >220° C., even better >250° C., so that upon heating the PFPE does not diffuse out of the layer but remains permanently in the layer, even after heat treatment at 180° C.

It is also unexpectedly possible to produce a transparent mixed layer which contains both proportions of a copolymer of TFE/PDD (Teflon® AF) and also proportions of TFE/TTD (Ausimont Hyflon® AD) or TFE/PDM, that is to say, it is possible to produce a solution in FC 75, in which both Teflon® AF and also Hyflon® AD and/or TFE/PDM are dissolved. In that way, after evaporation of FC 75, the result obtained is layers which are admittedly not amorphous but nonetheless highly transparent and which can entail all possible intermediate values of the refractive index between AF and AD, depending on the respective ratio of the ingredients in the mixture.

In a first embodiment of the liquid light guide according to the invention the tubular sheath comprises Teflon® FEP or Hyflon® MFA and is of the following dimensions: $\varnothing_i=5$ mm, $\varnothing_a=6$ mm and L=3000 mm. On its internal surface the FEP tube is provided with an approximately $3-4\mu$ thick layer, comprising the Ausimont copolymer TFE/fluorodioxole TTD with a TTD content of 60 molar percent (trade name: Hyflon® AD 60) which is produced from a solution by simple wetting of the internal surface of the tube with the dissolved polymer and subsequent evaporation of the perfluorinated solvent (FC 75 from 3M).

A subsequent heat treatment of the tube coated with the copolymer TFE/TTD, above the glass transition temperature of the copolymer at about 145° C.–180° C., quite substantially improves the adhesion of the layer to the substrate. After the heat treatment the coated FEP tube is filled with an aqueous ionic solution, for example with an aqueous $CaCl_2$ (n=1.435) or $NaH_2PO_4$ (n=1.38) solution, the open ends of the FEP tube being closed off in known manner by cylindrical polished plugs of quartz glass.

Instead of aqueous ionic salt solutions, the filling liquids used can also be glycols such as for example triethylene glycol or DMSO with additions of water. Even pure water as the filling liquid already has a slight degree of light conduction by virtue of the relatively low refractive index of the amorphous copolymer (TFE/TTD) or homopolymer (TTD) from Ausimont.

$H_2O$ which occurs in the various filling liquids can also be partially or entirely replaced by $D_2O$, which results in an improvement in transmission in the red spectral range.

The transmission of a liquid light guide of that kind, which is internally coated with the copolymer TFE/TTD, in the blue and also in the near ultraviolet spectral range (about 320–400 nm) is 80%, in which respect only 65% transmission is measured if the FEP tube is not coated internally. In this embodiment the liquid is an aqueous $CaCl_2$ solution with n=1.435, the standard liquid which has been almost exclusively used on the market over the last 20 years for liquid light guides with a Teflon® FEP tube.

The flexural losses of a coated liquid light conductor of that kind (thickness of the layer=$4\mu$, n layer=1.3232) are reduced by about 100% with respect to the uncoated light conductor.

In a second embodiment of a liquid light conductor in accordance with the invention the tubular sheath is also, as in the first example, a Teflon® FEP tube of the dimensions: $\varnothing_i=5$ mm and L=3000 mm, which is coated on its internal surface with a mixture of Teflon® AF 1600 (40 percent by weight) and Hyflon® AD 60 (60 percent by weight). The thickness of the layer is $4.5\mu$. The optical refractive index of the layer is n=1.317. Once again, as in the first example, the filling liquid is $CaCl_2/H_2O$, n=1.435.

The transmission of this liquid light guide is also 80% in the blue spectral range and therefore also represents a peak value for internally coated liquid light conductors.

The advantage of the mixed layer is that the ratio of the ingredients in the mixture, AD to AF, makes it possible to adjust both the refractive index and also the thickness of the layer, depending on the respective need for optimum transmission. Adhesion of the mixed layer to tubes of fluorocarbon polymers such as for example Teflon® FEP or Hyflon® MFA is excellent in particular after heat treatment above 160° C.

It is also possible to produce mixed layers which contain not only the components Hyflon® AD and/or TFE/PDM and Teflon® AF, but in addition also as a third component one of the above-mentioned high-boiling perfluoropolyethers (PFPE) such as Fomblin®, Galden®, Krytox® or Demnum® as a permanent constituent.

All four materials: Hyflon® AD, TFE/PDM, Teflon® AF and PFPE can be simultaneously dissolved in the percentage range in the perfluorinated liquid (for example FC75 or FC77 from 3M) and the complex layer can be produced in a simple manner by one-off wetting of the internal surface of the tube with the solution and subsequent evaporation of the solvent FC 77. The permanent presence of the PFPE oil in the dried and heat-treated layer makes it possible to advantageously influence the elastic properties and the adhesiveness of the layer to the respective substrate. The layer becomes more elastic and more adhesive due to the PFPE and thus has better adhesion to non-perfluorinated substrates which for example may be only partially fluorinated or contain no fluorine at all.

What is claimed is:

1. A liquid light guide comprising a cylindrical tubular sheath of plastic or glass which is internally filled with a liquid having a refractive index of n>1.33, wherein on its internal surface the sheath is coated with a thin layer comprising a perfluorinated amorphous fluorocarbon polymer with the lowest possible level of residual crystallinity, high transparency and a refractive index of n<1.33, characterized in that the perfluorinated fluorocarbon polymer contains 10 to 100 molar % of a perfluorinated fluorodioxole cyclic monomer of the general formula:

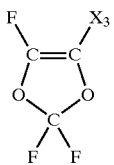

wherein $X_3$ is $CF_3$ or $OCF_3$.

2. A liquid light guide according to claim 1 wherein the perfluorinated fluorocarbon polymer forming the layer further comprises a copolymerisable perfluorinated monomer unit selected from the group consisting of tetrafluoroethylene (TFE), hexafluoropropylene (HPF), perfluoro-2,2-dimethyl-1,3-dioxole (PDD) and a perfluoroalkylvinylether.

3. A liquid light guide according to claim 2 wherein the perfluorinated fluorocarbon polymer forming the layer comprises tetrafluoroethylene in addition to the fluorodioxole.

4. A liquid light guide according to claim 2 wherein the perfluorinated fluorocarbon polymer forming the layer contains a copolymer of TFE and TTD of the formula:

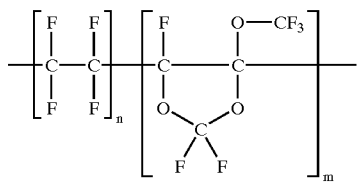

wherein n and m are so chosen that there is about 60 molar % of TTD in the copolymer.

5. A liquid light guide according to claim 3 wherein the perfluorinated fluorocarbon polymer forming the layer contains a copolymer of TFE and perfluoro4-methyl-1,3-dioxole of the formula:

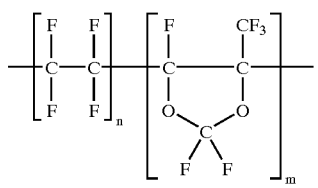

wherein n and m are so chosen that there is about 60 molar % of TTD in the copolymer.

6. A liquid light guide according to claim 1 wherein the perfluorinated fluorocarbon polymer forming the layer comprises at least two different fluorodioxoles as monomer units.

7. A liquid light guide according to claim 6 wherein the perfluorinated fluorocarbon polymer further comprises tetrafluoroethylene.

8. A liquid light guide according to claim 1, wherein the proportion of fluorodioxole in the perfluorinated fluorocarbon polymer forming the layer is at least 8 molar %.

9. A liquid light guide according to claim 1, wherein the proportion of fluorodioxole in the perfluorinated fluorocarbon polymer forming the layer is 10 to 100 molar %.

10. A liquid light guide according to claim 9, wherein the proportion of the fluorodioxole TTD is between 30 and 95% with respect to the molar weight of the perfluorinated fluorocarbon polymer forming the layer, and wherein the glass transition temperature is higher than 80° C.

11. A liquid light guide according to claim 10 wherein the glass transition temperature is between 60 and 240° C.

12. A liquid light guide according to claim 10 wherein the glass transition temperature of the perfluorinated fluorocarbon polymer forming the layer is between 60 and 170° C.

13. A liquid light guide according to claim 1, wherein the proportion of fluorodioxole in the perfluorinated fluorocarbon polymer forming the layer is 20 to 95 molar %.

14. A liquid light guide according to claim 1 wherein the layer of the perfluorinated fluorocarbon polymer further comprises a high-viscosity perfluoropolyether with a boiling point of at least 220° C.

15. A liquid light guide according to claim 14 wherein the perfluoropolyether is contained in a proportion by weight of between 5% and 200%, measured in relation to the solid polymer constituent of the layer.

16. A liquid light guide according to claim 1, wherein the thickness of the layer is between $0.1\mu$ and $10\mu$.

17. A liquid light guide according to claim 16, wherein the thickness of the layer is $2-6\mu$.

18. A liquid light guide according to claim 1, wherein the cylindrical tubular sheath comprises a fluorocarbon polymer selected from the group consisting of a copolymer of tetrafluoroethylene and hexafluoropropylene, a copolymer of tetrafluoroethylene and perfluoromethylvinylether, a copolymer of tetrafluoroethylene perfluoropropylvinylether, tetrafluoroethylene, a copolymer of tetrafluoroethylene and ethylene, polychlorotrifluoroethylene and a terpolymer of tetrafluoroethylene, hexafluoropropylene and vinylidene fluoride.

19. liquid light guide according to claim 1, wherein the cylindrical tubular sheath comprises glass or a non-fluorine-bearing plastic material.

20. A liquid light guide according to claim 1, wherein the liquid filling the interior of the tubular, internally coated sheath is water or an aqueous solution of $CaCl_2$ and/or $CaBr_2$ or $NaH_2PO_4$, wherein the water can also be heavy water or a mixture of water and heavy water.

21. A liquid light guide according to claim 1, wherein the liquid contains a glycol or dimethylsulphoxide.

22. Use of perfluorinated homo- or copolymers according to claim 1 for the internal coating of flexible sheath tubes for liquid light guides, wherein the inner coating is of a thickness of 0.1–10$\mu$ and forms the internal total-reflection layer of the liquid light guide, wherein the total-reflection layer has a lower refractive index than the liquid.

23. Use of perfluorinated homo- or copolymers according to claim 22 characterized in that the flexible sheath tubes to be coated of the liquid light guides comprise fluorocarbon polymers.

24. Use of perfluorinated homo- or copolymers according to claim 22 for the production of liquid light guides, characterized in that the homo- or copolymer is dissolved in a fluorinated or perfluorinated liquid in a range of concentration of at least 0.5% by weight, preferably 2.0% by weight, and that the inner coating of the sheath tubes of the liquid light guides is produced by wetting of the internal surface of the tube with said solution and subsequent evaporation of the solvent and a subsequent heat treatment of the coated tube.

25. Use of the liquid light guides according to claim 1 for technical adhesion by light-induced polymerization in the spectral range of from 250 to 500 nm.

26. Use of the liquid light guides according to claim 1 for technical endoscopy.

27. Use of the liquid light guides according to claim 1 for medical endoscopy.

28. Use of the liquid light guides according to claim 1 for hardening teeth fillings by light-induced polymerization of dental composite materials in the blue light range of 400–500 nm.

29. Use of the liquid light guides according to claim 1 for bleaching teeth in the UVA or in blue light range.

30. A liquid light guide according to claim 1, wherein the perfluorinated fluorocarbon polymer forming the layer further comprises the amorphous copolymer of tetrafluoroethylene and perfluoro-2,2-dimethyl-1,3-dioxole.

31. A liquid light guide according to claim 30, wherein the amorphous copolymer of tetrafluoroethylene and perfluoro-2,2-dimethyl-1,3-dioxole is contained in the layer in a proportion by weight of between 5% and 80% and that the glass transition temperature of the amorphous copolymer of tetrafluoroethylene and perfluoro-2,2-dimethyl-1,3-dioxole modification is between 120 degrees Celsius and 240 degrees Celsius.

* * * * *